United States Patent
Lee et al.

(10) Patent No.: US 6,724,438 B2
(45) Date of Patent: Apr. 20, 2004

(54) APPARATUS FOR COMPENSATING DIGITAL VIDEO SIGNAL

(75) Inventors: In Ho Lee, Seoul (KR); Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 09/800,907

(22) Filed: Mar. 8, 2001

(65) Prior Publication Data

US 2001/0020983 A1 Sep. 13, 2001

(30) Foreign Application Priority Data

Mar. 8, 2000 (KR) ........................................ 2000-11518

(51) Int. Cl.[7] .............................. H04N 5/52; H04N 5/57; H04N 5/58; G06K 9/56
(52) U.S. Cl. ...................... 348/687; 348/673; 348/678; 348/587; 382/274
(58) Field of Search ................................ 348/687, 602, 348/673, 678, 745–747, 806, 807, 587; 382/274, 254

(56) References Cited

U.S. PATENT DOCUMENTS

| | | | | | |
|---|---|---|---|---|---|
| 4,731,865 | A | * | 3/1988 | Sievenpiper | 382/274 |
| 4,868,668 | A | * | 9/1989 | Tavernetti | 348/745 |
| 5,031,227 | A | * | 7/1991 | Raasch et al. | 382/199 |
| 5,546,134 | A | * | 8/1996 | Lee | 348/673 |
| 5,572,337 | A | * | 11/1996 | Kajitani et al. | 358/461 |
| 5,594,816 | A | * | 1/1997 | Kaplan et al. | 382/275 |
| 5,708,451 | A | * | 1/1998 | Baldi | 345/75.2 |
| 5,760,843 | A | * | 6/1998 | Morimura et al. | 348/672 |
| 5,854,661 | A | * | 12/1998 | Kochanski | 348/602 |
| 5,910,792 | A | * | 6/1999 | Hansen et al. | 345/74.1 |
| 5,940,140 | A | * | 8/1999 | Dadourian et al. | 348/587 |
| 6,072,540 | A | * | 6/2000 | Park | 348/687 |
| 6,075,574 | A | * | 6/2000 | Callway | 348/673 |
| 6,137,541 | A | * | 10/2000 | Murayama | 348/673 |
| 6,246,445 | B1 | * | 6/2001 | Kwon | 348/687 |
| 6,268,939 | B1 | * | 7/2001 | Klassen et al. | 358/518 |
| 6,320,626 | B1 | * | 11/2001 | Lee | 348/687 |
| 6,323,915 | B1 | * | 11/2001 | Marflak et al. | 348/704 |
| 6,337,695 | B1 | * | 1/2002 | Bang | 345/690 |
| 6,552,731 | B1 | * | 4/2003 | Gonsalves | 345/589 |

FOREIGN PATENT DOCUMENTS

JP        10-341451        12/1998

* cited by examiner

Primary Examiner—Michael H. Lee
Assistant Examiner—Paulos Natnael
(74) Attorney, Agent, or Firm—Birch, Stewart, Kolasch & Birch, LLP

(57) ABSTRACT

An apparatus for displaying a digital video signal includes a shade reflection ratio calculator and a brightness compensator. The shade reflection ratio calculator calculates a shade reflection ratio r of each pixel per display clock using a linear distance function between a center pixel and a current pixel on a screen. The brightness compensator compensates brightness of each pixel by applying the shade reflection ratio value r and a brightness adjustment width Yrate to an input digital video signal. Thus, it is possible to improve picture quality of a video displayed on a screen.

9 Claims, 5 Drawing Sheets

APPARATUS FOR COMPENSATING DIGITAL VIDEO SIGNAL

BACKGROUND OF THE INVENTION

1. Field of the Invention

The present invention relates to an apparatus for compensating a digital video signal.

2. Description of the Related Art

Recently, with development of a technique for processing a digital video signal and improvement of a display device of the digital video signal, it is general tendency that display devices have large sizes. Such a tendency of a large sized display device will be continued in accordance with increase of resolution and development of additional technologies when displaying a digital video signal.

Meanwhile, a current projection television receiver does not have excellent resolution. However, if a digital television receiver is popularized in accordance with its transmission and reception technologies, a video of high resolution can be displayed in the projection television receiver. In this respect, it is expected that the projection television receiver will receive much attention as a digital television receiver as a larger sized screen is required.

FIG. 1 is a block diagram showing a general structure of a display device.

Referring to FIG. 1, a video processor is based on both an analog mode and a digital mode. Recently, it is general that the video processor is implemented based on the digital mode.

Meanwhile, a display processor serves to directly display a digital video signal on a screen. The display processor of the projection television receiver is currently implemented based on the analog mode.

As described above, since a related art projection television receiver includes a display processor provided with an analog circuit, a digital video signal fails to be displayed at an original brightness level in each pixel position of the screen. In other words, brightness of the screen is varied depending on a viewing angle of a viewer of the projection television receiver. As an example, the displayed digital video signal is bright at the center of the screen while it becomes dark toward the periphery of the screen from the center thereof. This is also shown in case that a brightness value of the screen is actually measured for each area. That is, the brightness value of the screen is varied depending on positions on the screen, i.e. the center of the screen and the corner portion of the screen.

FIG. 2 is a diagram showing a brightness value variation of the digital video signal according to the positions on the screen when a full white video signal is displayed on the screen. Referring to FIG. 2, when the digital video signal is displayed, a video displayed on the screen of a two-dimensional screen has different brightness values depending on the positions on the screen.

Generally, all of the display devices have the highest brightness value at the center of the screen and the lowest brightness value in the periphery of the screen. Accordingly, the periphery of the screen is darker than the center.

As described above, the related art projection television receiver has different brightness values depending on the number of electron guns, the distance between the respective electron gun and the screen, and the coordinate position of the screen.

This is because that the distance between the respective electron gun and the screen is varied and it is difficult to exactly set a focus of electron beams for R, G, and B with respect to each point of the screen.

The difference of brightness on the screen occurs seriously in the projection television receiver. Particularly, the difference of brightness is more serious as the screen size of the projection television receiver becomes larger. As an example, for a large sized projection television receiver, a brightness difference of 30% or greater occurs at the center of the screen and the corner portion thereof.

SUMMARY OF THE INVENTION

To solve the above problems, an object of the present invention is to provide an apparatus for compensating a digital video signal in which a brightness value of each pixel is compensated before the digital video signal is displayed.

Another object of the present invention is to provide an apparatus for compensating a digital video signal in which the uniform distribution of brightness is maintained on a whole screen when displaying a digital video signal.

Other object of the present invention is to provide an apparatus for compensating a digital video signal in which a hardware construction is easily implemented.

To achieve the above object, an apparatus for compensating a digital video signal according to one aspect of the present invention is characterized in that a linear distance function is obtained between a center pixel and each pixel on a screen consisting of x coordinates and y coordinates.

An apparatus for compensating a digital video signal according to another aspect of the present invention is characterized in that a shade reflection ratio of each pixel is calculated per display clock using the linear distance function, and brightness of each pixel is adjusted by the shade reflection ratio.

An apparatus for compensating a digital video signal according to another aspect of the present invention includes a shade reflection ratio calculator for calculating a shade reflection ratio of each pixel per display clock, using a linear distance function between a center pixel and a current pixel on a screen. The apparatus according to another aspect of the present invention also includes a brightness compensator for compensating brightness of each pixel corresponding to an input digital video signal using the shade reflection ratio value r and an externally provided brightness adjustment range Yrate.

In the preferred embodiment of the present invention, brightness of a digital video signal is compensated by a digital video signal processor before the digital video signal is displayed on a screen, so as to decrease brightness difference between the center of the screen and the periphery thereof. Thus, load of the analog display processor is reduced, thereby improving picture quality of the displayed video.

It is to be understood that both the foregoing general description and the following detailed description are exemplary and explanatory and are intended to provide further explanation of the invention as claimed.

BRIEF DESCRIPTION OF THE DRAWINGS

Other objects, characteristic features and advantages of the present invention will now become apparent with a detailed description of an embodiment made with reference to the accompanying drawings, in which.

DETAILED DESCRIPTION OF PREFERRED EMBODIMENTS

The following is a detailed description of a preferred embodiment of an apparatus for compensating a digital video signal according to the present invention made with reference to the accompanying drawings.

Generally, a video displayed on a screen of a projection television receiver has a non-linear characteristic in which the highest brightness value is obtained in the center of the screen and the lowest brightness value is obtained in a corner of the screen. Accordingly, if a function corresponding to variation of the brightness value could be obtained, the brightness can be compensated using a symmetric function to the function corresponding to variation of the brightness value. However, it is difficult to obtain an exact function corresponding to the variation of the brightness value.

In the present invention, to obtain an exact function corresponding to the variation of the brightness value, an actual brightness value of the projection television receiver has been first measured. As a result, it is noted that the brightness becomes gradually darker in a portion within a constant distance from the center of the screen while the brightness value becomes remarkably lower in four corner portions of the screen furthest away from the center.

In the present invention, to coincide with the result, the function corresponding to the variation of the brightness value is set as follows.

Figure 1:
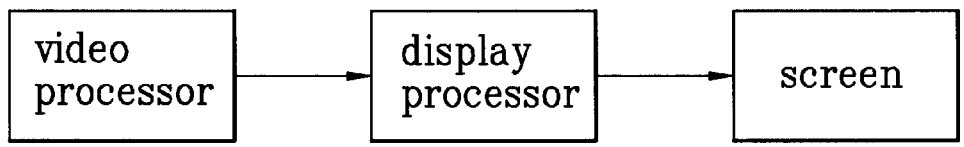
FIG. 1 is a block diagram showing a general structure of a display device.
Figure 2:
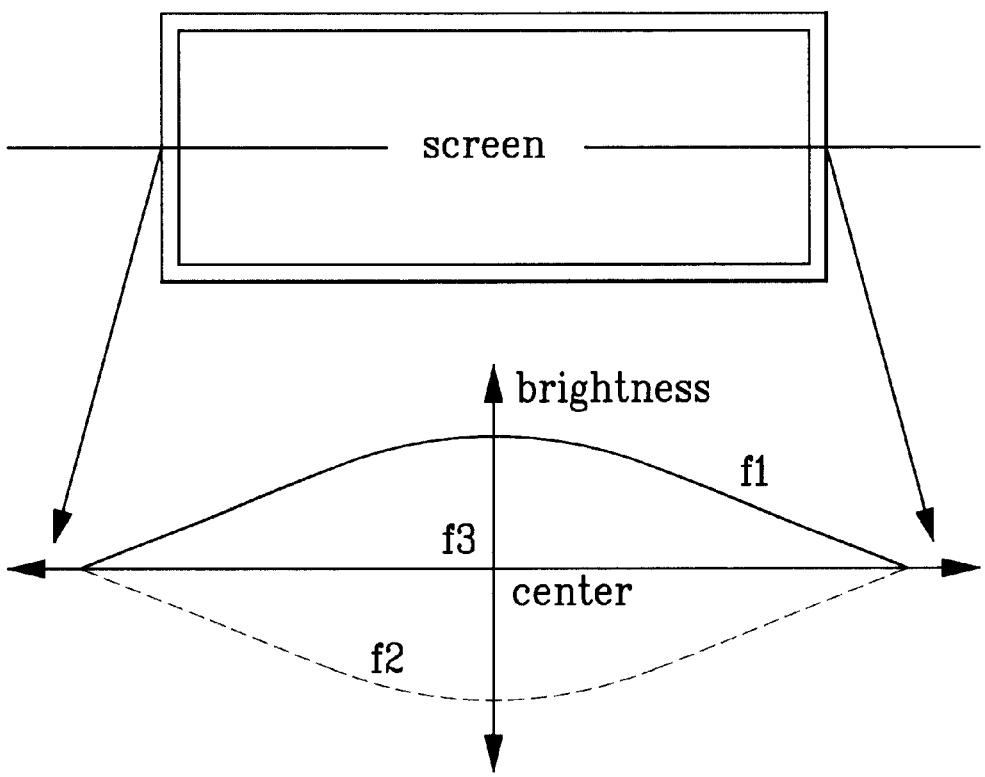
FIG. 2 is a diagram showing a brightness value variation of a full white video on a two-dimensional plane depending on the positions on a screen when the full white video is displayed on the screen.

In FIG. 2, supposing that a first graph corresponding to the variation of the brightness value on a two-dimensional plane of the screen is f1 and is expressed by a first algorithm, a second algorithm corresponding to a symmetric graph f2 of the first graph f1 is obtained.

Using the second algorithm, the brightness value is compensated in accordance with each position coordinate of the screen by a video processor of the projection television receiver or a digital signal processor.

As described above, since the digital video signal is compensated before display, a brightness function of the compensated digital video signal has the same brightness value in all positions of the screen, as shown a graph f2 of FIG. 2.

Figure 3:
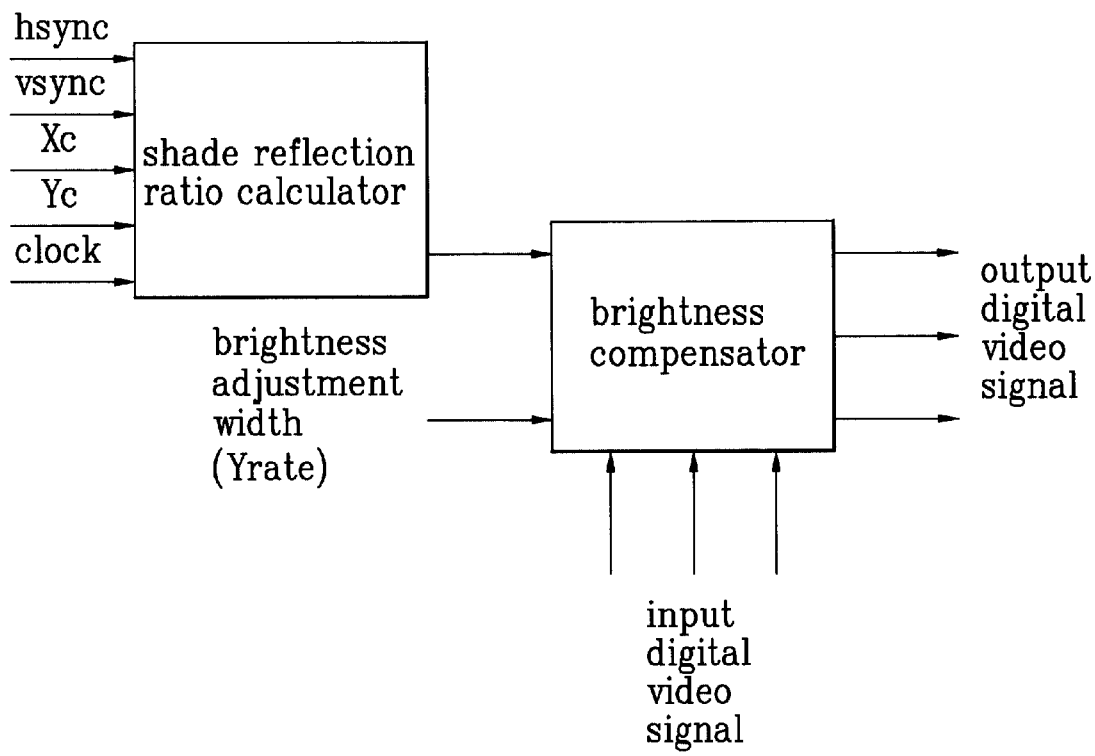
FIG. 3 is a block diagram showing an apparatus for compensating a digital video signal according to the present invention.

FIG. 3 is a block diagram showing a configuration of an apparatus for compensating a digital video signal according to the present invention. The apparatus of FIG. 3 includes a shade reflection ratio calculator 301 and a brightness compensator 302.

The shade reflection ratio calculator 301 inputs a horizontal synchronizing signal hsync, a vertical synchronizing signal vsync, and a system clock signal clock to designate a display region of the screen. The shade reflection ratio calculator 301 also counts the horizontal synchronizing signal hsync and the vertical synchronizing signal vsync whenever the system clock signal is generated.

Whenever the system clock signal and the synchronizing signals are counted, a shade reflection ratio r for an x coordinate value and a y coordinate value of each input pixel is obtained. That is, the shade reflection ratio r of each pixel is obtained with a function corresponding to the symmetric graph f2 of FIG. 2.

The brightness compensator 302 compensates brightness of each pixel by applying the shade reflection ratio value r calculated by the shade reflection ratio calculator 301 to a corresponding pixel of the input digital video signal. The brightness compensator 302 has a format of combination logic.

Meanwhile, to synchronize the shade reflection ratio calculator 301 with the brightness compensator 302, exact latency of the shade reflection ratio calculator 301 is obtained.

To process the input digital video signal in real time, the horizontal synchronizing signal hsync and the vertical synchronizing signal vsync are then transmitted to the brightness compensator 302 as fast as the exact latency of the shade reflection ratio calculator 301.

Figure 4:
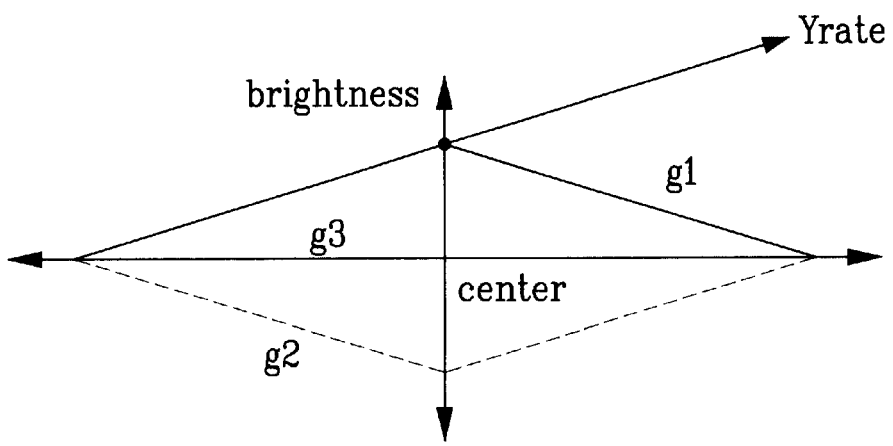
FIG. 4 is a graph showing an example of a symmetric function to a linear function when a brightness value on the screen of a two-dimensional plane is varied in a format of the linear function.

If the graph f1 of FIG. 2 is linear like a graph g1 of FIG. 4, a graph g2 symmetrical to the graph g1 can be obtained as shown in FIG. 4. Meanwhile, the screen that displays the digital video signal is generally a two-dimensional plane.

Figure 5:
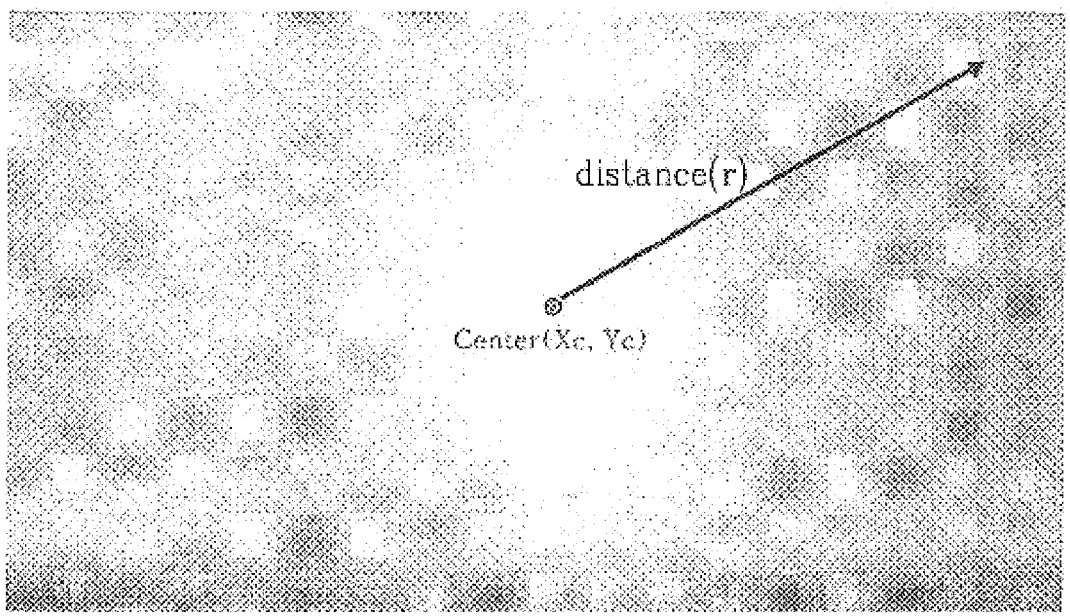
FIG. 5 is a diagram showing brightness depending on the distance from a center pixel when a full white video is displayed on a screen of a two-dimensional plane.

A brightness difference in the graph f1 of FIG. 4 can be displayed on the two-dimensional plane as shown in FIG. 5. Referring to FIG. 5, when a full white video signal is input, brightness of the screen becomes gradually dark as the distance r from the center coordinates Xc and YC of the screen is far away.

Meanwhile, the shade reflection ratio calculator 301 calculates a shade reflection ratio r of each pixel per display clock using a linear distance function between a center pixel and a current pixel on the screen. Then, the shade reflection ratio calculator 301 outputs the resultant value to the brightness compensator 302.

The brightness compensator 302 reflects the shade reflection ratio value r and the brightness adjustment width Yrate on a corresponding pixel of the input digital video signal to generate a digital video signal having brightness compensated depending on the positions on the screen.

The shade reflection ratio calculator 301 obtains the distance between the center coordinate of the screen and respective pixel coordinate based on an algorithm below. At this time, the distance farthest away from the center is normalized at '1', and the distance between the position of each pixel and the center is normalized at a value between 0 and 1.

Figure 6A:
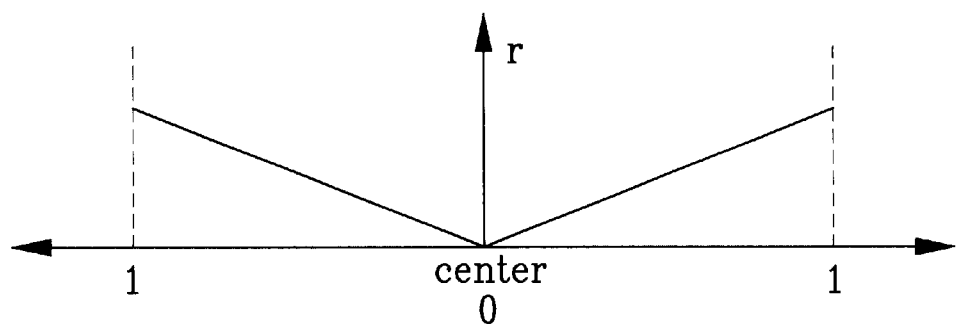
FIG. 6a is a graph showing the size of a shade reflection ratio value based on the center of the screen.

FIG. 6a is a graph showing the values normalized on the basis of the center of the screen.

$$r = sqrt(Xc-x)^2 + (Yc-y)^2 / sqrt(Xc^2 + Yc^2) \quad (1)$$

Xc and Yc: x and y coordinate values of the center pixel

X and y: x and y coordinate values of the current pixel

Since the brightness value is rapidly decreased in a portion away from the center of the screen, the brightness compensator 302 squares the distance value r normalized between 0 and 1 or three or four squares it to simply implement hardware.

Figure 6B:
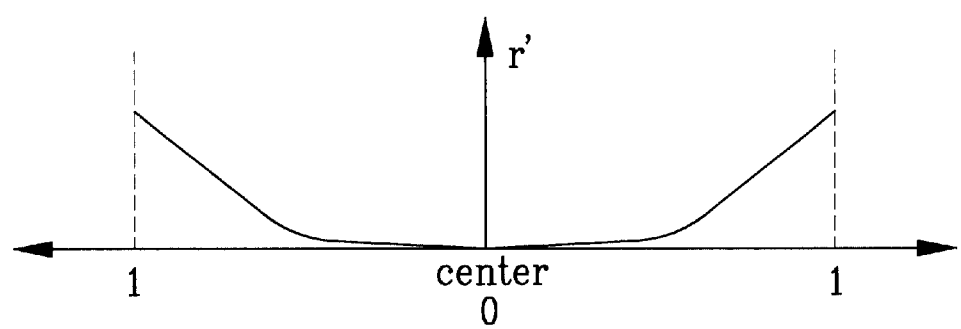
FIG. 6b is a graph showing a resultant value obtained by squaring a shade reflection ratio value based on the center of the screen.
Figure 6C:
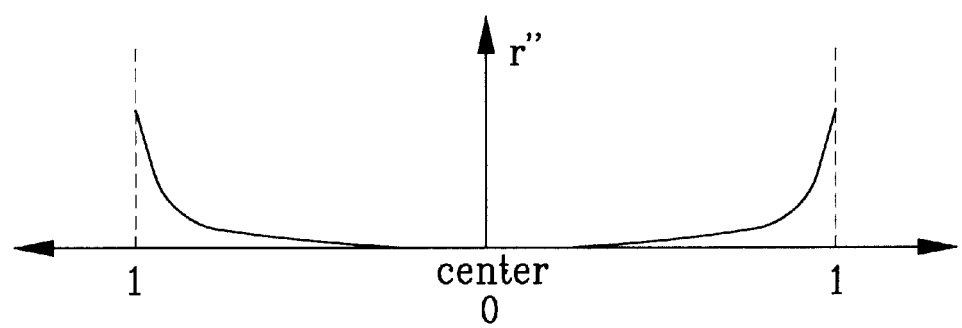
FIG. 6c is a graph showing a resultant value obtained by four squaring of a shade reflection ratio value based on the center of the screen.

FIG. 6b is a graph showing a resultant value obtained by squaring the normalized distance value r, and FIG. 6c is a graph showing a resultant value obtained by four squaring the normalized distance value r.

Preferably, the resultant value of FIG. 6b or 6c is used to obtain uniform brightness on the screen.

As an example, it is considered that the brightness compensator 302 compensates brightness of the input digital video signal using the resultant value r" obtained by four squaring the normalized distance value r. If the digital video signal is a YUV signal that a luminance signal Y as a brightness component of the digital video signal is separated, only brightness of the luminance signal Y is compensated.

On the other hand, in a case where the brightness component is not separated from the digital video signal such as RGB format signal, brightness of all the pixels is compensated.

To compensate the luminance signal Y, the following algorithm (2) is used.

$$Yo=Yi-Yi\times(Yrate\times(1-r''))  \quad (2)$$

Yo: a value of compensated brightness for each pixel

Yi: input pixel value

Yrate: brightness adjustment width

In the algorithm (2), the brightness adjustment range Yrate denotes a ratio of the darkest portion on the screen when the value range that the luminance component Y takes is normalized at '1'. That is, when the digital video signal is 8 bits, a value between 0 and 255 is normalized at a value between 0 and 1.

If the brightness adjustment range Yrate is set by 0.6 and a full white video signal having luminance value Y of 255 is input, the pixel at the darkest portion on the screen has a value of 255×0.6=. The value of 255×0.6=153 can be externally loaded. The brightness adjustment range Yrate is to allow a user to adjust an actual display resultant value.

In the algorithm (2), the X coordinate value Xc or the Y coordinate value Yc of the center pixel is a user interface value like the brightness adjustment range Yrate.

Meanwhile, if the input pixel value Yi corresponds to the full white video signal in the algorithm (2), the pixel value Yo having the compensated brightness is a symmetric function value to a previously made function.

Figure 7:
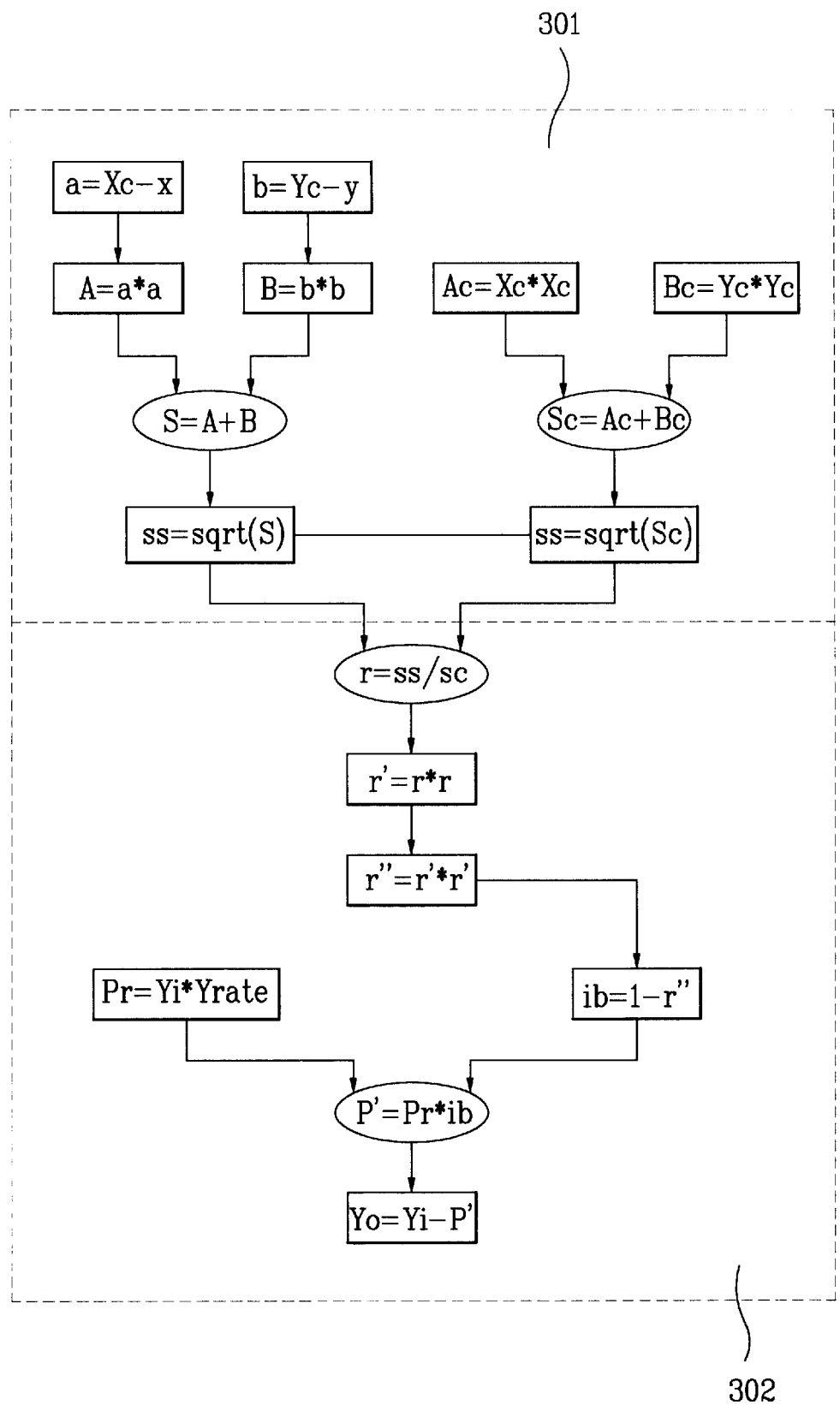
FIG. 7 is a block diagram showing hardware configuration of a shade reflection ratio calculator and a brightness compensator according to the present invention.

FIG. 7 is a block diagram showing hardware implementation of the shade reflection ratio calculator 301 and the brightness compensator 302. FIG. 7 shows a construction that the algorithms (1) and (2) are expressed as a hardware implementation.

Referring to FIG. 7, the shade reflection ratio calculator 301 and the brightness compensator 302 have a pipeline structure that each stage is comprised of one flip-flop.

Therefore, the pixel value Yo after compensating brightness is successively obtained for each pixel position on the screen. Meanwhile, respective operations can be internally divided into various stages based on a system specification. Accordingly, the shade reflection ratio calculator 301 and the brightness compensator 302 have a pipeline structure having at least ten stages.

Meanwhile, the coordinate value of each pixel is obtained using a display active signal (or data valid signal for calculating data). At this time, a signal synchronized with the actual input pixel data Yi should not be used. Supposing that the construction of FIG. 7 is a pipeline structure having ten stages, it is necessary to obtain a coordinate value using a display active signal of 7 clocks before the input pixel data Yi is used. This is because that the coordinate value should be obtained more quickly than the active display signal for synchronization.

Meanwhile, if the digital video signal is actually processed by the method suggested in the present invention, the whole brightness level of the screen becomes dark as much as the brightness adjustment range Yrate. However, the whole brightness level can be enhanced in the analog display circuit.

As described above, a function corresponding to the variation of brightness is obtained by the measuring result of brightness of the screen, and brightness of each pixel is compensated by the obtained function, thereby facilitating implementation of hardware.

Meanwhile, it is tendency that application specific integrated circuit (ASIC) technology is rapidly developing and various tools for more easily implementing a digital circuit are also continuously developing.

Accordingly, if the aforementioned functions and hardware structures corresponding to the functions are applied to the display device for processing a digital video signal in real time, it is possible to enhance display effect of the digital video signal. Particularly, in case of the projection television receiver, it is possible to uniformly generate the difference between the brightness values depending on the position on the screen.

In case of displaying the digital video signal on the screen, the difference of the brightness values depending on the position on the screen is not compensated in the display part of the present invention. The difference of the brightness values is compensated in advance using the symmetric function of the obtained function by the video signal processor provided with a digital logic circuit that facilitates implementation of hardware. Accordingly, it is possible to process the digital video signal in real time and easily implement a circuit.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for compensating a digital video signal comprising:

a shade reflection ratio calculator for calculating a shade reflection ratio of each pixel per display clock using a linear distance function between a center pixel and a current pixel on a screen; and a brightness compensator for compensating brightness of each pixel corresponding to an input digital video signal using the shade reflection ratio value r and an externally provided brightness adjustment range Yrate wherein the brightness compensator is a hardware element that compensates brightness of the luminance signal Y corresponding to each pixel using an algorithm below:

$$Yo=Yi-Yi\times(Yrsite\times(1-r''))$$

where, Yo is a value of compensated brightness for each pixel, Yi is an input pixel value, and Yrate is a brightness adjustment range that is ratio of the darkest portion when the range of the value that the luminance component Y can take is normalized at '1'.

2. An apparatus for compensating a digital video signal comprising:

shade reflection ratio calculator for calculating a shade reflection ratio of each pixel per display clock using linear distance function between a center pixel and a current pixel on a screen; and brightness compensator for compensating brightness of each pixel corresponding to an input digital video signal using the shade reflection ratio value r and an externally provided brightness adjustment range Yrate, wherein the shade reflection ratio calculator is a hardware element that calculates the shade reflection ratio value r using an algorithm below:

$$r = sqrt(Xc-x)_2 + (Yc-y)_2 / sqrt(Xc_2 + Yc_2) \qquad (1)$$

where Xc and Yc denote x and y coordinate values of the center pixel, and x and y denote x and y coordinate values of the current pixel on the screen.

3. The apparatus of claim 2, wherein the shade reflection ratio calculator has a pipeline structure including multi-staged flip-flops.

4. The apparatus of claim 1, wherein the size of the brightness adjustment range is adjusted by a user.

5. The apparatus of claim 1, wherein the hardware corresponding to the brightness compensator has a pipeline structure including multi-staged flip-flops.

6. The apparatus of claim 1, wherein the brightness compensator normalizes the shade reflection ratio value r and squares the normalized value, so that the squared value is used to compensate brightness of the input digital signal.

7. The apparatus of claim 1, wherein the brightness compensator compensates brightness of only the luminance component Y if the luminance component Y is separated from the input digital video signal.

8. The apparatus of claim 1, wherein the brightness compensator compensates brightness on the whole of the digital video signal if the input digital video signal is an RGB format signal of which brightness component is not separated.

9. The apparatus of claim 1, wherein a horizontal synchronizing signal hsync and a vertical synchronizing signal vsync applied to the brightness compensator are faster than the digital video signal as much as exact latency of the shade reflection ratio calculator so as to synchronize the shade reflection ratio calculator with the brightness compensator.

* * * * *